United States Patent [19]

Baumbach

[11] 4,314,304

[45] Feb. 2, 1982

[54] LINE PROTECTOR FOR A COMMUNICATIONS CIRCUIT

[75] Inventor: Bertram W. Baumbach, Arlington Heights, Ill.

[73] Assignee: Reliable Electric Company, Franklin Park, Ill.

[21] Appl. No.: 134,744

[22] Filed: Mar. 27, 1980

[51] Int. Cl.[3] .......................... H02H 9/04; H02H 3/22

[52] U.S. Cl. .................................... 361/124; 361/119; 337/32

[58] Field of Search ............... 361/124, 119, 118, 117, 361/120; 315/36; 337/32, 34, 33, 15, 28, 18

[56] References Cited

U.S. PATENT DOCUMENTS

| | | | |
|---|---|---|---|
| 1,892,567 | 12/1932 | Craddock | 337/32 |
| 3,254,181 | 5/1966 | Lemieux | 361/124 X |
| 3,975,664 | 8/1976 | Baumbach | 361/124 |
| 4,062,054 | 12/1977 | Simokat | 361/124 |
| 4,086,648 | 4/1978 | Hines et al. | 361/124 |

*Primary Examiner*—Patrick R. Salce

*Attorney, Agent, or Firm*—Trexler, Bushnell & Wolters, Ltd.

[57] ABSTRACT

A line protector has a gas tube surge arrester as a primary protector and an air gap as a secondary or back-up protector should the gas tube fail due to leakage. The secondary air gap is established by perforated plastic sheets which are interposed between a line terminal and a ground contact both of which are supported on an insulating base.

8 Claims, 7 Drawing Figures

LINE PROTECTOR FOR A COMMUNICATIONS CIRCUIT

BACKGROUND OF THE INVENTION

This invention relates to protectors of the general type used in central office telephone switching equipment. Devices of this type serve to protect the inside switching and like equipment from damage as a result of overvoltage and overcurrent conditions that may occur on the outside lines. Frequently these devices are referred to in the art as central office protectors.

One such type of protector is shown in U.S. Pat. No. 3,975,664 that issued Aug. 17, 1976. The protector shown and described in that patent provides a relatively fast operation on sensing and overvoltage or overcurrent condition on the line. A gas tube surge arrester is utilized to provide a discharge path to ground from each side of the line. In an overcurrent condition in the line a solder element is melted resulting in a spring-biased element being caused to engage the ground electrode of the gas tube so that a direct metallic path is provided from the line to ground. Furthermore, the device of the aforesaid patent is relatively small and compact, is simple and inexpensive to manufacture, and at the same time is capable of being mounted in a substantially standard base and housing. The device also has a five pin base construction which enables the unit to be plugged into known types of terminal blocks for central office protectors.

While a device of the foregoing type has proven to be satisfactory, a problem may exist if the gas tube within the device becomes vented to atmosphere. In such case protection would be lost because the electrodes of the gas tube would then be exposed to atmosphere. This would result in the voltage breakdown of the gas tube being far in excess of that suitable for line protection.

It will be appreciated that a gas tube surge arrester which has failed by reason of leakage will be difficult to detect simply because the line to which it is connected continues to operate properly. Accordingly, it is desirable to provide some type of air gap as a back up protection arrangement in the event of failure of the gas tube due to leakage. Line protectors having gas tube surge arresters and back up air gap secondary arresters are known, but in most cases the devices use numerous special parts which results in an increased cost of manufacture over standard central office protector devices.

OBJECTS AND SUMMARY OF THE INVENTION

An object of this invention is to provide a new and improved line protector of the foregoing type that provides a secondary air gap protection feature while at the same time retaining a number of pre-existing parts. Such an arrangement aids in reducing the manufacturing costs of the protector.

A further object of this invention is to provide a line protector of the type stated which maintains its characteristic of being able to be plugged into a known type of terminal board yet at the same time provides secondary or back up protection.

In accordance with the foregoing objects a line protector comprises an insulating base, line pins projecting from said base, a line terminal electrically connected to said line pins, an additional terminal, a ground pin connected to said additional terminal, said ground pin also projecting from said base, said ground pin and additional terminal being electrically insulated from said line terminal and said line pins, a gas tube surge arrester having a line electrode and a round electrode spaced therefrom to define a primary arc gap, said line electrode being electrically connected to said line terminal and said ground electrode being electrically connected to said additional terminal, a ground contact seated on said base and in electrical contact with said ground pin, and insulator means at a spacing between a part of said line terminal that is in close proximity with said base and said ground contact, said insulator means having perforation means at which a secondary arc gap is provided between said terminal part and said ground contact, said secondary arc gap being an air gap having a rated breakdown voltage that is greater than the breakdown voltage of the primary arc gap but is less than the breakdown voltage of the primary arc gap if the gas has leaked from the gas tube.

In a typical construction the gap between the electrodes of the gas tube is of the order of 0.030 inches and results in a breakdown voltage of the gas tube of approximately 300 to 600 volts. Should the inert gas of the tube become vented to atmosphere, this breakdown voltage could exceed 3000 volts, which is entirely unsatisfactory for surge voltage protection. However, under such leakage conditions the secondary air gap comes into play and provides back-up protection. The breakdown voltage of the secondary or air gap should preferably not exceed about 1600 volts, but the air gap breakdown voltage should also have a controlled lower limit of about 700 volts. Such controlled lower limit is necessary in order to prevent the air gap from firing in the range of about 300 to 600 volts, namely the normal range of operation of a satisfactorily functioning gas tube.

DETAILED DESCRIPTION

Figure 1:
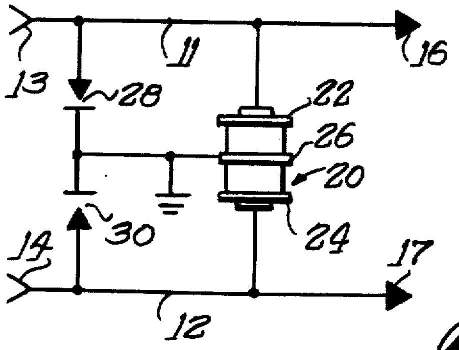
FIG. 1 is a simplified schematic diagram illustrating a telephone line pair with a protector connected to each side of the line.

Referring now to FIG. 1 there is shown a circuit diagram of the protector connected across a telephone line pair. The telephone line pair includes a first line 11 and a second line 12 adapted for connections to outside telephone lines through terminals 13, 14. The outside lines (i.e. the incoming lines) are connected to inside central office equipment through terminals 16, 17. The protector is connected across the lines 11, 12 to provide a primary gas tube surge arrester 20 and a secondary air gap surge arrester in the event of failure of gas tube due to venting to atmosphere. The gas tube surge arrester 20 is preferably of the three electrode type and comprises a body with first and second line electrodes 22, 24 connected respectively to lines 11, 12, and a center intermediate electrode 26 connected to ground. As will be described more fully hereafter, there is an arc gap between each line electrode 22, 24 and the ground electrode 26 that serves to provide surge voltage protection in the normal operating range of the gas tube. Under such conditions a voltage surge on either line 11 or 12 will arc across the associated line electrode 22 or 24 to the ground electrode 26 and hence to ground. Thus, the gas tube 20 provides a voltage breakdown means in the circuit between each line and ground to form a high impedance at a voltage below a predetermined value and a low impedance at a voltage above a predetermined value. However, upon failure of the gas tube due to venting, back-up protection is provided by secondary air gaps 28, 30 which provide for arc discharge to ground for transient voltages appearing on either line 11 or line 12. In a typical arrangement, the gaps 28, 30 are each preferably about 0.006 inches in width.

The line protector comprises a dielectric housing with a base 32 and a shell 34, both of which are of dielectric plastic material. The lower end of the shell 34 is open to receive the base 32, and the base has nibs 36 on opposed sides that snap fit with openings in the shell 34. The base 32 is formed with holes to receive pins that are disposed in an array suitable for plug-in mounting of the protector on a terminal board of conventional construction. Such terminal board may typically have six pin sockets disposed in a generally rectangular pattern in addition to a dummy or polarizing pin socket. The base 32 receives and supports a pin configuration that is compatible with the aforesaid six pin socket. More particularly, the base receives four line pins 40, 42, 44, 46 that project from the base and have respectively parallel axes that intersect the base to define substantially the four corners of a rectangle. The longer pins 42, 46 are respectively connected to the incoming lines while the shorter pins 40, 44 are respectively connected to the central office equipment. The line pins 40, 42 are in one of the line circuits 12 while the pins 44, 46 are in the other line circuit 11.

Provided within the housing are L-shaped metallic line terminals 48, 50. These line terminals 48, 50 respectively include base portions 52, 54 to which the several line pins are clinched. More specifically, line pins 40 and 42 are clinched to the base 52 while line pins 44, 46 are clinched to the base 54. Therefore, the respective line terminals 48, 50 provide electrical continuity between the respective pairs of line pins 40, 42 or 44, 46, as the case may be. A fifth or ground pin 56 projects from the base 32 intermediate the pins 40, 44. The part of the pin 56 that projects through the base 32 has a central axis that is parallel to the axes of the four pins 40, 42, 44, 46, and the path between the pins 40, 42 constitutes the longer dimension of the rectangle whose corners are at the axes of the four pins 40, 42, 44, 46.

The part of the ground pin 56 that is within the housing is bent to project toward the central region of the housing, and at one end has an intermediate terminal in the form of a U-shaped metallic clip 58 secured thereto. The opposite legs of the U-clip are slotted to receive the rim of the ground electrode 26. The clip 58 constitutes, in effect, a holder for the body of the gas tube 20 to support the gas tube in spaced relation to the base. An electrically conductive structure connects each of the end electrodes 22, 24 of the gas tube to a respective pair of line terminal pins. For this purpose caps 60, 60 receive the respective end electrodes 22, 24, the caps also receiving solder pellets 62, 62. The terminals 48, 50 are resilient to provide a spring bias against the caps 60, 60 to press them toward the clip 58. In the normal operation of the protector, the solder pellets 62, 62 prevent contact of the caps 60, 60 with the edges of the clip 58. However, in an overcurrent condition from either line to ground, one or both of the solder pellets 62, 62 will melt, thereby causing one or both of the line terminals 48, 50 to press one or both of the caps 60, 60 against the edge of the clip 58, thereby grounding the line through the ground pin 56.

Figure 2:
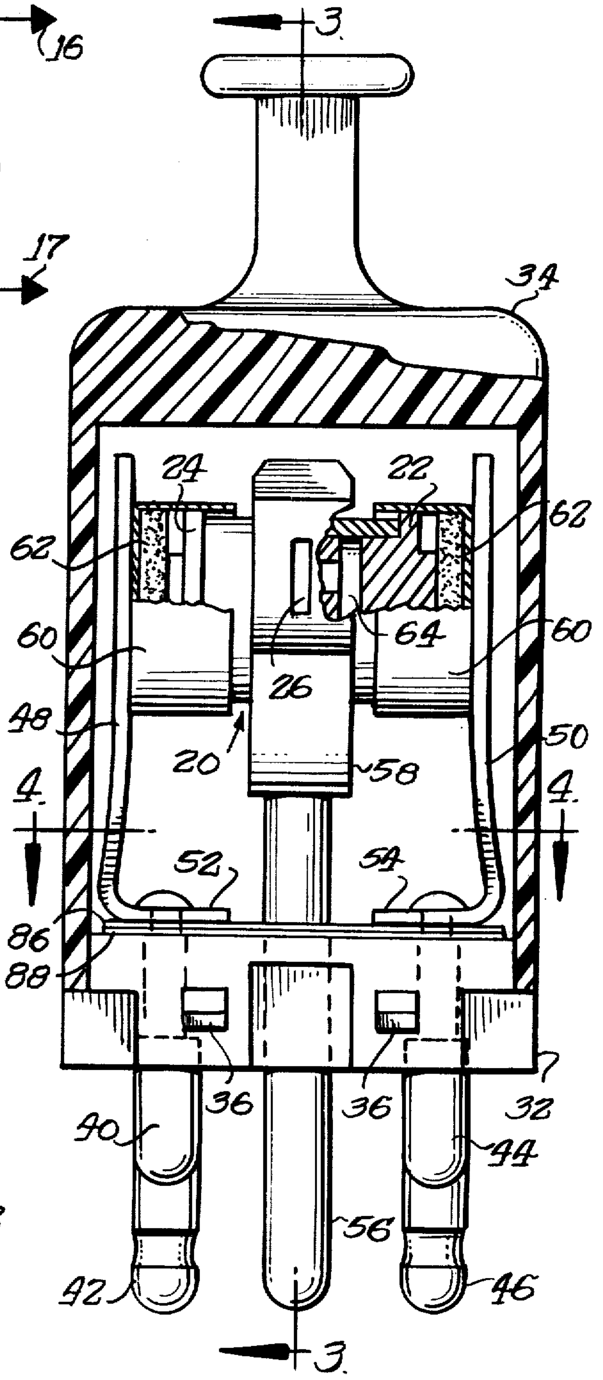
FIG. 2 is a side elevational view of the protector, partially broken away and in section.
Figure 3:
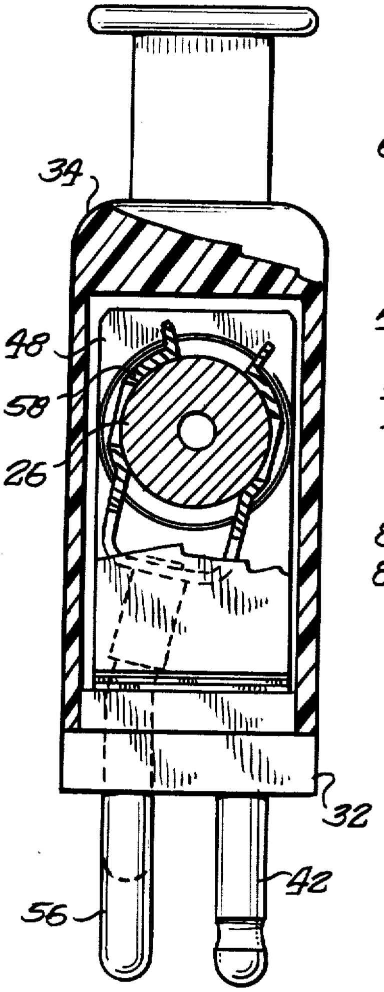
FIG. 3 is a fragmentary sectional view taken along line 3—3 of FIG. 2.

Since the gas tube 20 is of the three electrode type, there is an arc gap 64 (FIG. 2) between each end electrode 22 or 24 and center electrode 26. When the gas tube is functioning properly, this arc gap is preferably of the order of 0.030 inches and typically results in a breakdown voltage in the range of about 300 to 600 volts. Consequently, in an overvoltage condition on either line 11 or 12, there will be arc across the arc gap 64 resulting in a discharge to ground. However, if the gas tube has failed due to leakage of gas therefrom, an excessive voltage would be required to provide a breakdown across the gap 64; hence the present invention provides for secondary or back-up protection.

Figure 7:
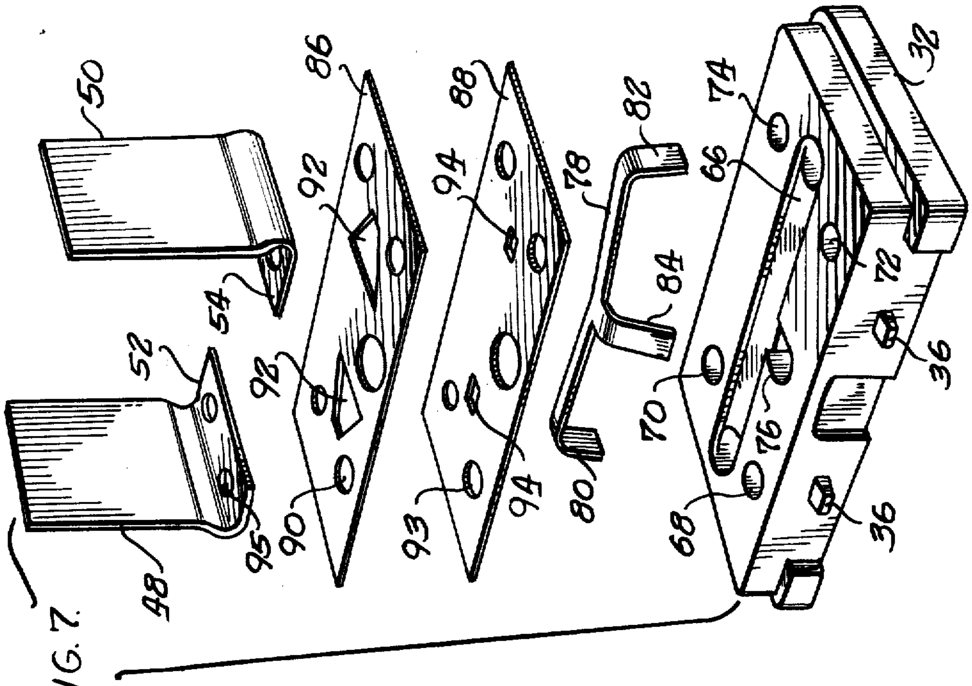
FIG. 7 is an exploded fragmentary perspective view of a portion of the protector.
Figure 4:
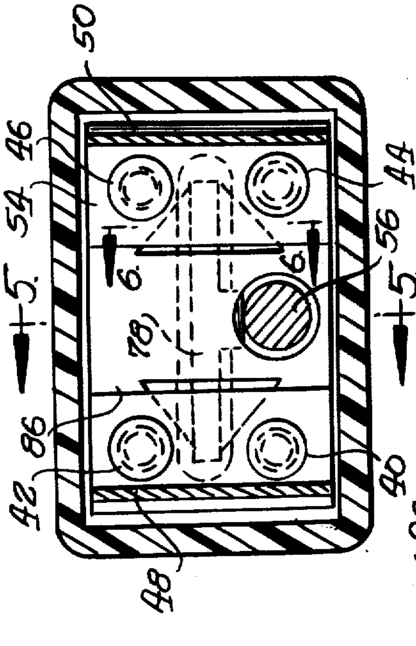
FIG. 4 is a sectional view taken along line 4—4 of FIG. 2.
Figure 5:
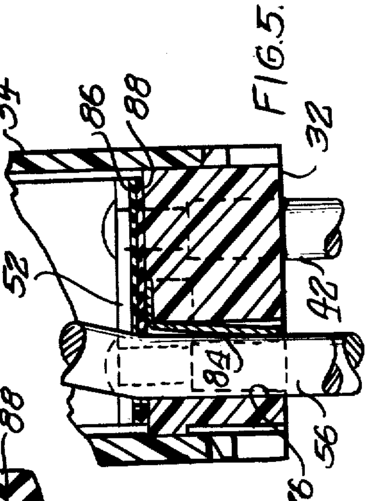
FIG. 5 is a fragmentary sectional view taken along line 5—5 of FIG. 4.

Formed on the inside base of the base 32 is an elongated slot 66 (FIG. 7) the opposite ends of which terminate approximately midway between holes 68, 70, 72, 74 that receive the respective pins 40, 42, 44, 46. The slot 66 also opens into a hole 76 for the ground pin 56. Positioned within the slot 66 is a resilient metallic ground contact 78 bent at its ends to form tabs 80, 82 which lodge within the slot 66, engaging the end walls thereof. The ground contact 78 also has a center tab 84 that fits within the hole 76 so as to engage the ground pin 56, as best seen in FIG. 5.

Interposed between the ground contact 78 and the base portions 52, 54 are insulating means in the form of sheets 86, 88 of mica or the like. The mica sheet 86 has a hole 90 which is aligned with a hole 93 in the sheet 88, the holes 90, 93 being also aligned with the hole 68 and a hole 95 in the terminal base 52. The aligned holes 68, 93, 90, 95 receive the pin 48. As will be seen from FIG. 7 a like set of aligned holes through the insulating sheet 86, 88 and the terminal bases, 52, 54 is provided for each of the several other line pins and the ground pin 56. Thus, the sheets 86, 88 and the contact 78 are clinched by the line pins between the contact base portions 52, 54 and the dielectric insulating base 32.

Figure 6:
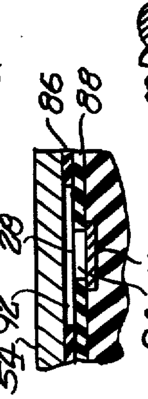
FIG. 6 is a fragmentary sectional view taken along line 6—6 of FIG. 4.

The insulating sheets 86, 88 each have perforations 92, 94 at which the secondary air gap 28 (FIG. 6) is established between the terminal base 54 and the ground contact 78. It will be understood that in like manner the air gap 30 is established between the terminal base 52 and the ground contact 78. In a preferred embodiment of the invention, each of the insulating sheets 86, 88 is approximately 0.003 inches in thickness so as to establish secondary air gaps 28, 30 of approximately 0.006 inches in width.

It will be noted that the perforation 92 is of a different peripheral size than the perforation 94. By way of example but not of limitation, the perforation 92 may be trapezoidal shaped whereas the perforation 94 may be square shaped. In any event, by having perforations of different sizes, the leakage path between the ground contact 78 and the terminal base 52 or 54, as the case may be, is reduced, thereby preventing under high humidity conditions, a discharge across the secondary gaps at voltages at or near the breakdown voltage of a properly functioning gas tube.

This invention is claimed as follows:

1. A line protector for a communications circuit comprising an insulating base, line pins projecting from said base, a line terminal electrically connected to said line pins, an additional terminal, a ground pin connected to said additional terminal, said ground pin also projecting from said base, said ground pin and additional terminal being electrically insulated from said line terminal and said line pins, a gas tube surge arrester having a line electrode and a ground electrode spaced therefrom to define a primary arc gap, said line electrode being electrically connected to said line terminal and said ground electrode being electrically connected to said additional terminal, a ground contact seated on said base and in electrical contact with said ground pin, and insulator means between a part of said line terminal that is in close proximity with said base and said ground contact, said insulator means having perforation means at which a secondary arc gap is provided between said part of said line terminal and said ground contact, said secondary arc gap being an air gap having a rated breakdown voltage that is greater than the breakdown voltage of the primary arc gap but is less than the breakdown voltage of the primary arc gap if the gas has leaked from the gas tube.

2. A line protector according to claim 1 in which said pins project through said insulator means.

3. A line protector according to claim 2 in which said line pins clinch said line terminal, said insulator means, and said ground contact to said base.

4. A line protector according to any of claims 1, 2 or 3 in which said insulator means comprises two sheets of insulating material, each of the two sheets having a perforation, the perforations being of different sizes and constituting said perforation means.

5. A line protector according to claim 1 or claim 2 in which said terminal is generally L-shaped and said terminal part is the base portion of the L.

6. A plug-in type line protector for a communication circuit comprising an insulating base, four line pins projecting from said base and having respectively parallel axes that intersect the base to define substantially the four corners of a rectangle, a ground terminal comprised of a pin projecting from the base intermediate two of said four pins and with the axis of the projected part of the ground pin being parallel to the axes of said four pins, the path between said last-mentioned two pins defining substantially the longer dimension of said rectangle and passing through the axis of the projected part of said ground pin, a gas tube protective device having end electrodes and a center electrode and with there being an arc gap between the center electrode and each of the end electrodes, electrically conductive grounding means connecting said center electrode to said ground pin, an electrically conductive structure connecting each end electrode to one pair of line terminal pins, means biasing said structures toward said grounding means, meltable means for normally maintaining said structures spaced from said grounding means an amount sufficient to prevent an electrical circuit therebetween but allowing direct contact of at least one of said structures with said grounding means upon there being an overcurrent condition in a circuit from either pair of associated line terminal pins through said protective device and to said ground pin, and means establishing an air gap in the circuit between each structure and the ground pin for providing a discharge path to ground from the line pins in the event of failure of the gas tube due to gas leakage; said last-named means including a contact supported by the base, and insulator means between a segment of each structure and said contact, said insulator means having a perforated part at the air gap.

7. A plug-in type protector according to claim 6 in which each said structure has a base portion at which the structure is clinched to its associated line terminal pins, one side of each air gap being at said base portion and the other side of each air gap being at said contact.

8. A line protector for a communication circuit comprising a housing of dielectric material and including a base, line pins in said base, a ground pin in said base, a gas tube surge arrester having a body in spaced relation with said base, first and second line terminals for respective connection to said line connector pins and an intermediate terminal for connection to said ground pin, said arrester including electrodes respectively connected to said terminals and comprising voltage breakdown means in the circuit between each of said line connector pins and said ground connector pin to provide in each of said circuits a high impedance at a voltage below a predetermined value and a low impedance at a voltage above said predetermined value, conductive elements each having a portion extending toward said intermediate terminal, said conductive elements each being normally spaced from said intermediate terminal, said first and second terminals including spring-bias means for applying longitudinal forces on said conductive elements to move said conductive elements toward said intermediate terminal, means opposing said spring-bias means when the current between said end terminals and said intermediate terminal is below a predetermined minimum value but operable to cause at least one of said elements to move toward said intermediate terminal to form a direct metallic ground circuit therewith when the current between said end terminals and said intermediate terminal is above said predetermined minimum value, and means forming an air gap in the circuit between each line terminal and said ground connector pin, said air gap having a breakdown voltage that is greater than the breakdown voltage of said gas tube surge arrester but less than the breakdown voltage of said surge arrester if the gas has leaked therefrom, said means forming the air gap comprising an insulating spacer defining the width of said air gap, the spacer being perforated at said air gap.

* * * * *